(12) United States Patent
Gates

(10) Patent No.: US 6,237,472 B1
(45) Date of Patent: May 29, 2001

(54) DRIP COLLECTOR

(76) Inventor: Richard L. Gates, 108 Roe Ave., Newark, OH (US) 43055

( * ) Notice: Subject to any disclaimer, the term of this patent is extended or adjusted under 35 U.S.C. 154(b) by 0 days.

(21) Appl. No.: 09/658,153

(22) Filed: Sep. 8, 2000

Related U.S. Application Data

(60) Provisional application No. 60/170,481, filed on Dec. 13, 1999.

(51) Int. Cl.[7] ............................. A47J 37/00; A47J 37/04; A47J 37/06
(52) U.S. Cl. ........................... 99/446; 99/400; 99/444; 99/450; 99/482; 126/9 R; 126/25 R
(58) Field of Search ........................... 99/339, 340, 400, 99/401, 444–450, 481, 482; 126/25 R, 9 R, 9 A, 41 R, 40, 43, 44, 39 E, 39 B

(56) References Cited

U.S. PATENT DOCUMENTS

| | | | |
|---|---|---|---|
| 4,773,319 | * | 9/1988 | Holland .................................. 99/446 |
| 4,862,795 | * | 9/1989 | Hawkins ............................. 99/444 X |
| 4,936,202 | | 6/1990 | Lin . |
| 5,109,834 | * | 5/1992 | Collins et al. ...................... 126/25 R |
| 5,333,540 | * | 8/1994 | Mazzocchi ......................... 99/450 X |
| 5,456,163 | | 10/1995 | Ceravolo . |
| 5,529,798 | | 6/1996 | Clark et al. . |
| 5,749,354 | * | 5/1998 | Lin ..................................... 126/25 R |
| 5,934,180 | * | 8/1999 | Lin ..................................... 99/340 X |
| 5,988,158 | * | 11/1999 | Schmidt, Jr. ....................... 126/25 R |
| 6,000,389 | * | 12/1999 | Alpert ................................ 126/25 R |
| 6,039,039 | * | 3/2000 | Pina, Jr. ............................. 126/25 R |
| 6,085,641 | * | 7/2000 | De'Longhi .............................. 99/446 |
| 6,131,505 | * | 10/2000 | Lin ..................................... 99/450 X |
| 6,155,248 | * | 12/2000 | Schlosser et al. ................. 126/25 R |
| 6,158,426 | * | 12/2000 | Wardell .............................. 99/400 X |

* cited by examiner

Primary Examiner—Timothy F. Simone
(74) Attorney, Agent, or Firm—Francis T. Kremblas; Kremblas, Foster, Phillips & Pollick

(57) ABSTRACT

A drip collector for a grill includes side walls, end walls, and a bottom. The drip collector is connected to a rear wall of a grill. When the grill is in use, grease and other droppings fall from the rear wall of the grill cover into the collector. The collector is then removed for cleaning.

12 Claims, 3 Drawing Sheets

DRIP COLLECTOR

CROSS-REFERENCES TO RELATED APPLICATIONS

This application claims the benefits of U.S. Provisional Application No. 60/170,481 filed Dec. 13, 1999.

STATEMENT REGARDING FEDERALLY-SPONSORED RESEARCH AND DEVELOPMENT (Not Applicable)

BACKGROUND OF THE INVENTION

1. Field of the Invention

The present invention relates to accessories for gas barbecue grills. More specifically, this version of the invention is concerned with pans, vessels, containers, and various other collectors that are releasably attached to a rear side wall of a grill in order to receive accumulations of hot grease, fat, and barbecue sauce dripping from a grill cover or lid that would otherwise drip onto a deck, floor, or ground surface.

2. Description of the Related Art

The use of grills as a means to cook various food items has gained in popularity and use in recent years as more consumers are making use of their back yard or other outdoor areas as a secondary or ancillary cooking and eating venue, especially during those times and seasons of the year when the weather and climate is conducive to such activity. An integral part of this endeavor is the use of a barbecue grill.

While charcoal barbecue grills have been used for many years, the gas barbecue grill is increasingly becoming the favored choice of many outdoor cooks and chefs because of its ease of use, i.e., trouble-free ignition and temperature control, minimal clean up requirements, and the like. Such grills are usually constructed with a rectangular support frame, cooking grid or surface, fuel tank, wheels, various utility boards attached to the sides of the cooking grid, and pivoting lid or cover.

During use, the pivoting cover is frequently raised to check the condition of the food stuffs being cooked on the cooking grid and to apply any necessary seasonings, bastings, and sauces, such as barbecue sauce. After the application of such bastings and sauces, the pivoting cover is closed upon the cooking grid, thereby concealing the food stuffs situated therein for continued grilling. Inevitably, the heat produced by such cooking in conjunction with the application of any bastings or sauces causes the internal juices, moisture, and fats of the foodstuffs and the applied bastings and sauces to splatter, spray, or otherwise be deposited upon the inner surfaces of the pivoting cover. The liquids deposited upon the front, top, and side walls will generally drip downward upon the cooking grid and food stuffs situated thereon.

However, the liquids deposited upon the inner surface of the rear wall of a pivoting cover will drip downward upon the inner surface thereof and drop onto a deck, floor, or ground surface, as the lower edge of the rear side wall generally extends for some distance away from the rear edge or surface of the cooking grid. Such droppings of fatty liquids will stain and soil such a supporting surface, contribute to a messy appearance, and hasten the need for extensive cleaning or resurfacing of the deck, floor, or support surface.

In addition, when the cover is pivoted to permit a user to view the foodstuffs, the liquids which have become deposited on the front, side walls and top of the grill cover will drip, by gravity, onto the rear wall of the cover. When this occurs, the material will then flow, also by gravity, down the rear wall of the cover and onto the ground or other surface on which the grill sits. This also contributes to the need for cleaning the supporting surface as mentioned above.

Various designs for barbecue grill accessories have been provided in the prior art. Even though these designs may be suitable for the specific individual purposes to which they address, they would not be suitable for the purposes of the present version of the invention. For instance, U.S. Pat. No. 5,586,491, issued to Diller et al. on Dec. 24, 1996 discloses a disposable barbecue grill shield intended for releasable attachment onto a barbecue grill to improve the cooking performance of said grill by taking advantage of varied eat patterns and flows, preventing food from falling into the heat source, and the like.

Other types of drip pans are also shown in the patents to Clark, U.S. Pat. No. 5,529,798; Lin, U.S. Pat. No. 4,936,202; and Ceravolo, U.S. Pat. No. 5,456,163. However, each of these drip pans is located inside the grill. No suggestion is made in any of the references of placing a drip pan or collector on the exterior surface of the grill.

What is needed then to overcome the aforementioned disadvantage of conventional grills is the provision of a drip collector that can be releasably attached to a rear side wall of such a grill in order to receive any liquids, juices, bastings, and sauces that will drop or separate from the inner surface or lower edge of the rear side wall(s) of a pivoting grill cover in order to prevent a supporting or deck surface from becoming soiled or stained.

BRIEF SUMMARY OF THE INVENTION

The present version of the invention, which will be described in greater detail hereinafter, relates to the field of accessories for grills. More specifically, this version of the invention is concerned with pans, vessels, containers, and various other collectors that are releasably attached to a rear side wall of a grill in order to receive accumulations of hot grease, fat, and barbecue sauce dripping from a grill cover or lid that would otherwise drip onto a deck, floor, or ground surface. The present invention overcomes all of the shortcomings listed previously, in addition to novel aspects that will be described in detail hereinafter.

Described briefly, according to a typical embodiment, the invention combines a drip collector with a particular type of grill. The grill is of the type which has front, side, and rear walls which enclose a cooking surface. A lid is pivotally attached adjacent the rear wall of the grill.

The drip collector includes two oppositely-disposed, elongated side walls. One of the side walls is connected in a generally horizontal, closely-spaced relationship to a rear wall of the grill. Two oppositely-disposed end walls are secured to the side walls. A bottom is joined to each of the side walls and each of the end walls.

The drip collector may further include a fastener which preferably releasably attaches the drip collector to the grill by connecting the one side wall to the rear wall of the grill. This fastener may be one or more hooks or a magnet. The hook preferably is fixed to the one side wall and extends over the rear wall of the grill, thereby holding the drip collector in generally horizontal position in a plane generally below the cover.

In a first embodiment of the fastener, the fastener is an elongated sheet. The sheet is in the form of an arm and an inverted U-shaped channel forming a hook which fits over the rear wall of the grill.

In the second embodiment of the hook, the fastener is two or more narrow strips. Each of the strips is in the form of an arm and an inverted U-shaped channel which fits over the rear wall of the grill.

Alternatively, the drip collector also includes at least one magnet. The magnet is fixed to the one side wall and secures the drip collector to the rear wall of the grill.

The bottom may be removable from the side and end walls. The collector is preferably formed from a thin-gauge aluminum and most preferably from a corrosion-resistant aluminum.

The collector may further include one or more handles. If there is a single handle, it is preferably secured to a side wall. It is most preferred to have two handles, one secured to each end wall.

Figure 1:
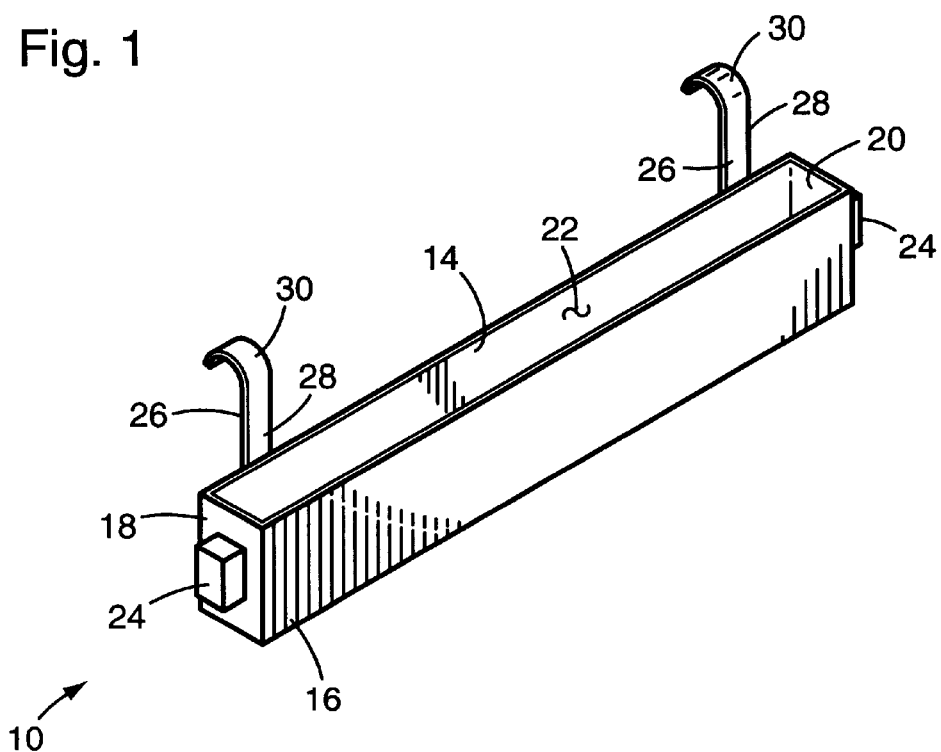
FIG. 1 is a perspective view of a first embodiment of a drip collector for a grill in accordance with the present version of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art. In addition, many elements are illustrated which are of a type which perform well known operations. Those skilled in the art will recognize that there are many, and in the future may be additional, alternative elements which are recognized as equivalent because they provide the same operations.

DETAILED DESCRIPTION OF THE INVENTION

Referring now to the drawings and, in particular, to FIG. 1, there is illustrated a first embodiment of the drip collector for a grill 10. The present version of the invention 10 is a unitary device that is generally elongate and rectangular in appearance. The collector 10 is comprised of elongated, rectangular rear 14 and front 16 side walls that are maintained in oppositely-disposed parallel relation and shorter, rectangular lateral end walls 18, 20 that are also oppositely-disposed in parallel relation. A bottom 21 (see FIG. 4) is attached to said side walls 14, 16, and end walls 18, 20 at corresponding edges thereof so that said side walls 14, 16, end walls 18, 20 and bottom 21 enclose an interior space or cavity, access to which is gained by a top aperture 22.

A pair of fasteners 26 is affixed at opposing ends to the exterior surface of the rear side wall 14. Each fastener is comprised of a flat, straight rectangular arm portion 28 that is attached to the rear side wall 14 and extends from the top edge therefrom in coplanar relation for some distance until it curves rearwardly at a second end into a U-shaped channel or hook portion 30.

Figure 2:
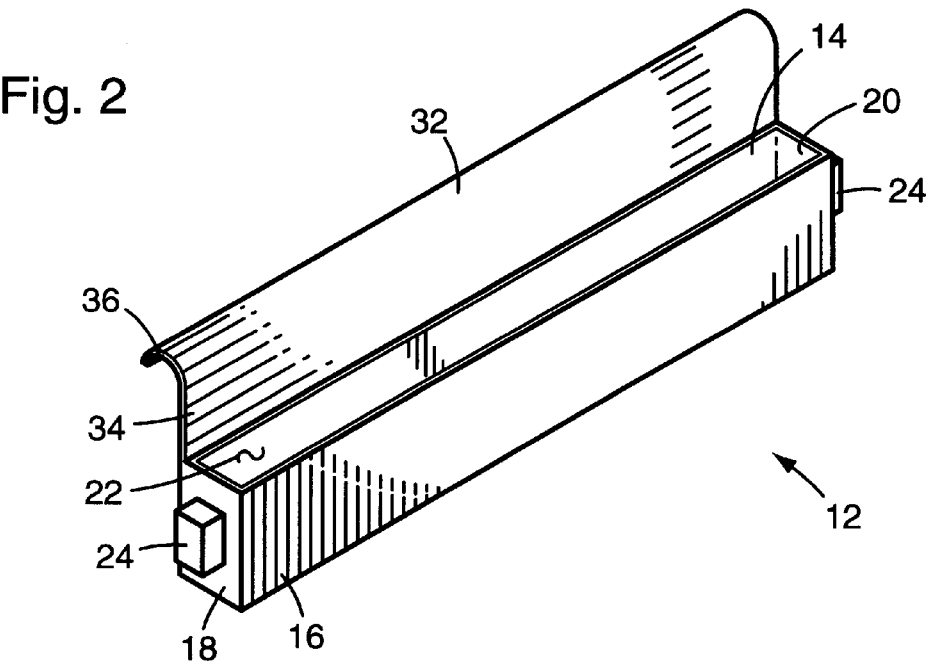
FIG. 2 is a perspective view of a second embodiment of a drip collector for a grill in accordance with the present version of the invention.

In a second embodiment 12 of this version of the invention as shown in FIG. 2, a fastener 32 of unitary construction is attached to the rear side wall 14 or can be formed as an integral portion thereof. The fastener 32 nevertheless is comprised of a flat, rectangular arm 34 portion that extends above the top edges of the front 16 and end 18, 20 walls for some distance and in coplanar relation to the rear side wall 14 until it curves rearwardly at a second end into a U-shaped channel or hook portion 36.

Figure 3:
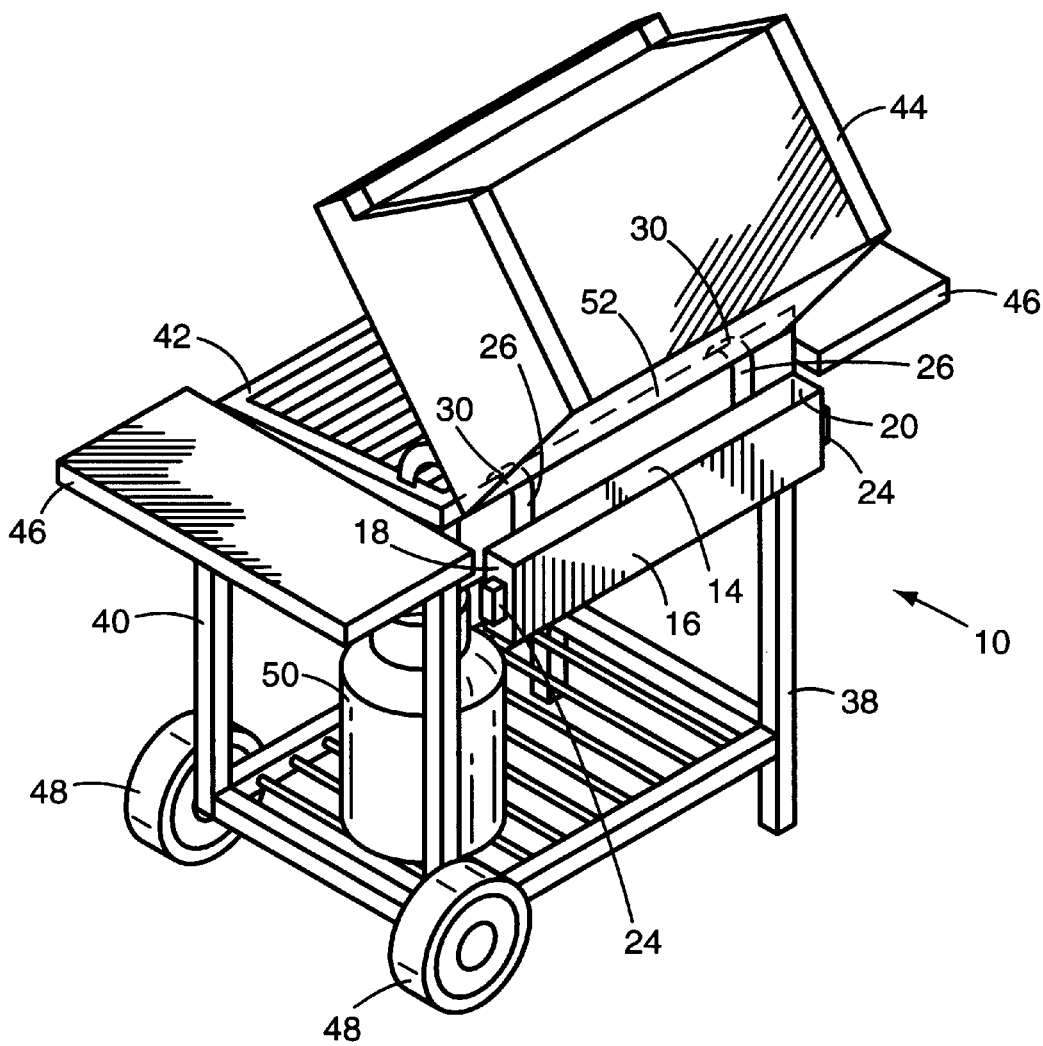
FIG. 3 is a perspective view of a first embodiment of a drip collector releasably attached to a rear side wall of a grill for collection of drip deposits therein.

Referring to FIG. 3, therein illustrated is the first embodiment 10 of the drip collector attached to a conventional gas barbecue grill 38. The grill 38 is comprised in part of a rectangular support framework 40, a flat cooking grid 42 upon which foodstuffs are positioned for grilling and cooking, a pivoting cover 44 that is secured to the cooking grid 42, utility boards 46 attached to each side of said cooking grid 42, wheels 48, and a fuel tank 50. The grill 38 is also constructed with a rear wall 52 (shown in phantom line) that is either attached to the rear of the cooking grid 42 or formed as a separate device, depending upon the brand and manufacture of the grill. As illustrated, the pivoting cover 44 is raised at some distance above the top surface of the cooking grid 42 in order to permit access to foodstuffs situated thereon for application of any bastings, sauces, or other cooking liquids. The collector 10 is releasably attached to the grill 38 by positioning the U-shaped channels or hooks 30 of the fasteners 26 over and onto the top edge of the rear side wall 52. In this manner, the portion of the collector 10 enclosed by the side walls 14, 16, end walls 18, 20 and bottom 21 will receive, catch, or otherwise collect any of the aforementioned bastings, sauces, or other cooking liquids that may splatter or deposit onto the inner surfaces of the cooking cover 44 once it is closed over the cooking grid 42 and particularly those that drip or drop from the inner surfaces of the rear side wall or portion of the cover 44 that extends for some distance away from the cooking grid to a position directly above a deck, floor, or support surface. As such, the collector 10 minimizes the amount of the aforementioned bastings, sauces, or other cooking liquids which drop onto and soil or stain said deck, floor, or support surface.

The collector 10 is preferably long enough to collect grease and other droppings for substantially the entire width of the grill 38. The longer the collector 10, the greater the probability of catching the vast majority of the grease and other droppings. However, the collector 10 should not be too long, because if it extends too far from the sides of the grill, a user may brush against it and spill hot oil on his or her clothing or body, which is not desirable. Therefore, it is important that the collector 10 not be too long.

It is also important that the width of the collector 10 be sufficient to collect the majority of the grease and other droppings. If the collector is too narrow, the grease will not be effectively collected. If it is too wide, a user may again accidentally brush it and cause a hazardous condition. Also, if the collector is too wide, it may cause too great a degree of torque on the fasteners 26, 32, and overbend them.

The collector 10, 12 is preferably constructed of material that is lightweight, durable, and economical to acquire and manufacture, such as aluminum, wood products, plastics, various composite materials, or any combination thereof. The various components thereof can be formed or attached by various processes, such as casting, metal stamping, and various methods of joining, such as welding or bonding, or use of conventional fastening devices. Most preferably, the collector 10, 12 is made from a thin-gauge corrosion-resistant aluminum. It is important that whatever material is selected, it must have a melting temperature or ignition temperature which is high enough that the collector 10, 12 will not melt or catch fire at the ordinary temperature to which a grill is ordinarily heated.

Each of the embodiments of FIGS. 1–3 includes handles 24. It is preferred that one handle 24 be secured to each of the end walls 18, 20. This permits a user to lift the collector 10, 12 from the grill 38 evenly and without spilling any grease or other debris from the collector 10, 12. The handles 24 may be made from the same material as the remainder of the collector 10, 12. Alternatively, the handles 24 may be made from a heat-resistant material, so that the handles do not conduct heat to a user's hands, in the event a user wishes to remove and clean the collector before the grill has fully cooled.

The width of the fasteners 26, 32 may vary. Grills 38 tend to generally be made in about the same size ranges. However, it is desirable that the collector 10, 12 be manufactured in only one size which can fit any grill. The fasteners 26, 32 must be sized and spaced so that they can fit over the rear wall 52 of the grill 38 without interfering with the action of the pivoting cover 44. As a result, as shown in FIG. 1, it may be desirable to have the full length between the fasteners 30 be smaller than the length of the side wall 14. This creates a greater degree of flexibility of the number of grills with which the collector 10, 12 may be used. As in the FIG. 2 embodiment, the fastener 32 may, of course, extend the full width of the collector 12.

Figure 4:
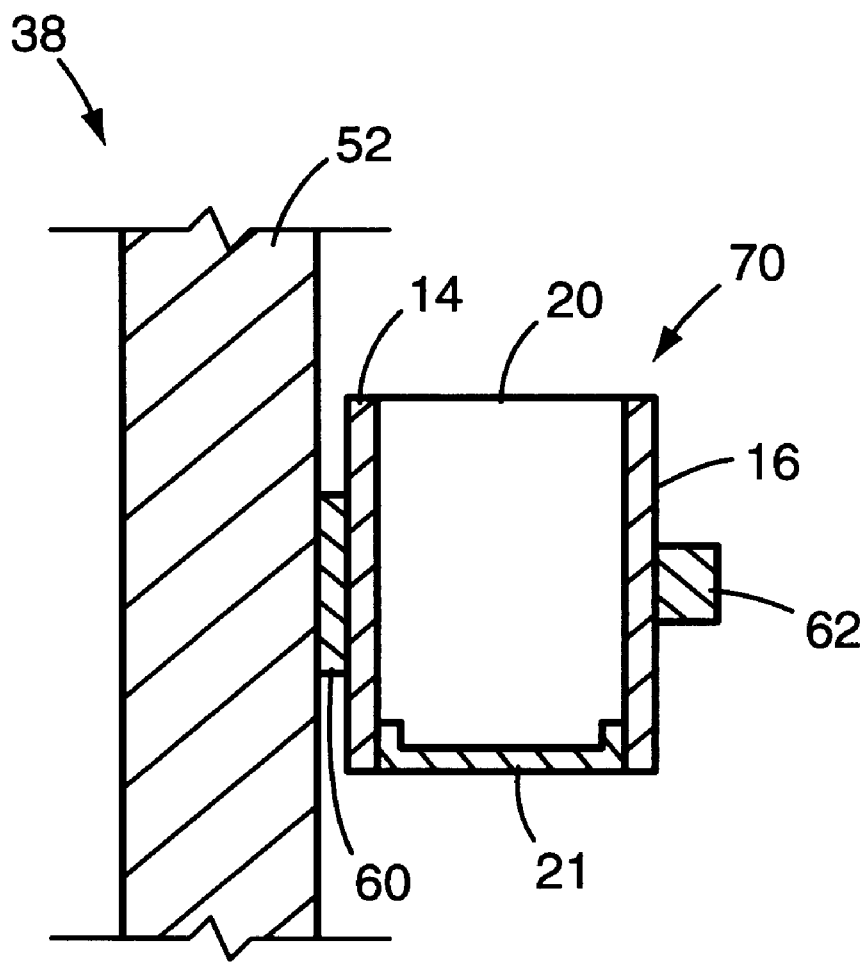
FIG. 4 is a partial sectional view of a drip collector releasably attached to a rear wall of a grill with a magnet.

Yet another embodiment of the invention is shown in FIG. 4 and creates an even greater degree of flexibility in the fastener 60. FIG. 4 is a partial sectional view of the collector 70 which includes some alternatives to the basic configuration shown in FIGS. 1–3.

This embodiment includes at least one magnet 60 secured to one of the side walls 14. Many grills are made from steel or other magnetic metals. The magnet 60, like the fasteners disclosed in the previous embodiments, connects the side wall 14 in a generally horizontal, closely-spaced relationship to the rear wall of the grill 52. However, there is no need to carefully consider the length of the magnet 60, except that it must be long and wide enough to be strong enough to support the weight of the collector 70 and the grease and other droppings which will be collected in the collector 70. If a magnet 60 is used, the width of the grill 38 and the opening to the grill are not as important, since the magnet can be secured all along the grill without interfering with the arm for the pivoting cover 44. However, the magnet 60 must not be so thick that the collector 70 is too far from the rear wall of the grill, because in such a case, the collector 70 will not collect the droppings from the cover 44. Alternatively, a plurality of spaced magnets 60 may be used in place of a single magnet 60.

This embodiment also shows the bottom 21. The bottom 21 is secured to each of the side walls 14, 16, and each of the end walls 18, 20. It is preferable that the bottom 21 be removably secured to the side walls 14, 16 and end walls 18, 20, for ease of cleaning after use. The bottom 21 must be configured to remain in place while grease and other droppings are being deposited in the collector 70, but to be able to be removed later. However, the bottom 21 may also be permanently secured to the end walls 18, 20 and side walls 14, 16, particularly for ease of manufacture.

FIG. 4 also shows an alternative embodiment of the handle 62. As shown, the handle 62 may be secured to the side wall 16 opposite the side wall 14 secured to the rear wall 52 of the grill 38. The use of a single handle 62 may be desirable for ease of lifting or removing the collector 70 from the grill 38. If only a single handle 62 is used, it is preferred that it be secured generally centrally on the side wall 14, rather than on an end wall 18, 20, for reasons of balance, to minimize the probability of dropping the collector 70 when it is full of grease and droppings.

In each of the embodiments discussed above, the collector is releasably secured to the grill. However, it is also possible to form the collector and grill integrally. However, this modification, while possible, is not preferred. If the collector is not removable from the grill, there is difficulty in being able to clean the collector. If the collector itself is not removable, then the botttom of the collector must be removable, or at the very least, a drain plug must be provided to permit a user to drain the droppings from the collector. It is preferable that the collector be removable, so that the entire collector can be removed from the grill and cleaned.

While certain preferred embodiments of the present invention have been disclosed in detail, it is to be understood that various modifications may be adopted without departing from the spirit of the invention or scope of the following claims.

What is claimed is:

1. In combination with a cooking grill of the type having a rear wall and a lid pivotably attached adjacent the rear wall, a drip collector, comprising:

(a) two oppositely-disposed, elongated side walls, one of the side walls connected in a generally horizontal, closely-spaced relationship to the rear wall of the grill;

(b) two oppositely-disposed end walls, each end wall being secured to each of the side walls;

(c) a bottom joined to each of the end walls and each of the side walls; and (d) a fastener attaching the drip collector to the grill.

2. The drip collector according to claim 1, wherein the fastener is fixed to one of the side walls and extends over the rear wall of the grill to hold the drip collector in generally horizontal position relative to the grill.

3. The drip collector according to claim 2, wherein the fastener comprises an elongated sheet in the form of an arm and an inverted U-shaped channel forming a hook which fits over the rear wall of the grill.

4. The drip collector according to claim 2, wherein the fastener comprises two or more narrow strips, each strip being in the form of an arm and an inverted U-shaped channel forming a hook which fits over the rear wall of the grill.

5. The drip collector according to claim 1, wherein the bottom is removable from the walls.

6. The drip collector according to claim 1, wherein the drip collector is formed from a corrosion-resistant aluminum.

7. The drip collector according to claim 1, further comprising a handle secured to one of the side walls of the collector.

8. The drip collector according to claim 1, further comprising a handle secured to one of the end walls of the collector.

9. The drip collector according to claim 8, further comprising a second handle secured to the other of the end walls of the collector.

10. The drip collector according to claim 1, wherein the fastener comprises at least one magnet fixed to one of the side walls, the magnet securing the drip collector to the rear wall of the grill.

11. The drip collector according to claim 1, wherein the collector is releasably attached to the grill.

12. The drip collector according to claim 1, wherein the walls and bottom of the collector are located in a plane generally below the lid.

\* \* \* \* \*